Patented Jan. 26, 1926.

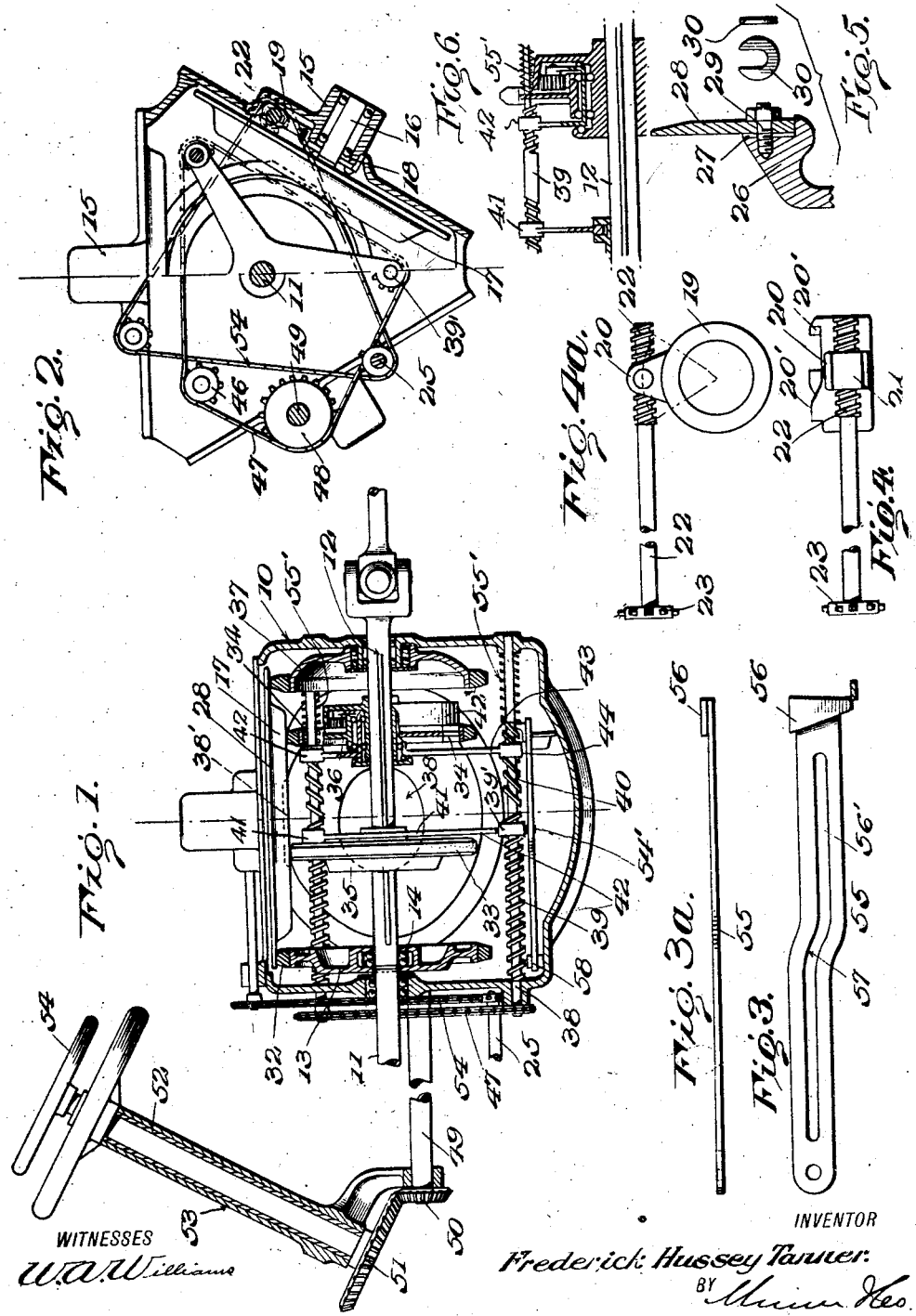

1,570,867

UNITED STATES PATENT OFFICE.

FREDERICK HUSSEY TANNER, OF BRISTOL, ENGLAND.

SPEED-CHANGING TRANSMISSION.

Application filed April 17, 1923. Serial No. 632,696.

*To all whom it may concern:*

Be it known that I, FREDERICK HUSSEY TANNER, a subject of the King of Great Britain, residing at Bristol, England, have invented certain new and useful Improvements in Speed-Changing Transmissions, of which the following is a specification.

This invention relates to improvements in speed changing transmissions for motor vehicles or the like.

In carrying out the invention there is included the usual driving shaft and the usual driven shaft and associated with the driven shaft is a plurality of shiftable members which may be brought to a neutral position and which also may be utilized for obtaining a predetermined low speed of the driven shaft, and likewise a predetermined high speed of the driven shaft.

The principal object of the invention is that in obtaining either the low speed or high speed of the driven shaft, the same will take place in a gradual manner; that is, in moving the shiftable member for obtaining low speed the same will gradually bring the driven shaft from rest to a predetermined speed and when moving the shiftable member for obtaining high speed the driven shaft will be operated upon after being brought to low speed and gradually brought to a high and predetermined speed.

It is a further object of the invention that when moving the shiftable member for obtaining low speed to its neutral position that the speed of the driven shaft will decrease gradually and that a like decrease of the driven shaft will be had when moving the shiftable member for obtaining high speed to its neutral position.

A still further object of the invention is that means be provided whereby the shiftable member of the transmission may be operated from a remote point or the steering post of an associated motor vehicle.

Other objects, and objects relating to details of construction, combination and arrangement of parts will hereinafter appear in the detailed description to follow.

The invention is illustrated by way of example in the accompanying drawings, in which:

Figure 1 is a vertical sectional view of a transmission unit involving the present invention and also showing in vertical section the steering post and wheel of the associated vehicle to which the invention may be applied, Figure 2 is a front elevation of the transmission unit with parts broken away and shown in section, Figure 3 is a top plan view of a latch element employed;

Figure 3ª is an edge view of the same;

Figure 4 is a top plan view of a second control or latch element employed in the transmission;

Figure 4ª is a view in side elevation of the same;

Figure 5 is a group view illustrating the adjusting means for the driving flange of each friction disc employed in the transmission unit, and Figure 6 is a fragmentary sectional view illustrating the connection employed between the lay shaft and a driving wheel therefor.

Referring to the drawings more particularly, 10 indicates generally a transmission casing which has journaled in one end thereof a drive shaft 11 and in its other end a driven shaft or lay shaft 12. Upon the end of the shaft 11 projecting into the casing 10 there is rigidly secured a drive wheel 13, said drive wheel having its hub provided with suitable ball bearings, as at 14, whereby to journal the associated end of the lay shaft 12. The casing 10 is preferably triangular in cross section, as illustrated to advantage in Figure 2, and in each side wall and also the cover of the casing there is provided a journal 15 which is adapted to rotatably support the stub shaft 16 of a friction disc 17. The shafts 16 are freely movable longitudinally of the bearings 15. Each bearing 16 has formed at its inner end a plurality of protrusions 18, and between these protrusions and the disks 17 in each instance there is interposed a collar 19, said collar having its inner face formed with a plurality of protrusions 20′, each having an inclined face, as shown, which is adapted to engage with a lug 18 and thereby with the rotative movement of the collar in one direction, to press the associated disc 17 inwardly. Each collar 19 is provided with a pair of ears 20, between which there is pivotally supported a block 21, said block having a suitable threaded opening therethrough adapted to receive a screw rod 22. The screw rod 22 is journaled in any suitable manner as illustrated in Figure 1 and at its forward end carries a sprocket wheel 23. The sprocket wheels 23 are operatively connected by a sprocket chain 54, and one of the rods 22 is extended, as at 25, whereby the same may be utilized for rotating the remainder of the said screw rods, and in this way adjusting the different friction discs simultaneously.

Each friction disc terminates at the outer edge in a flange 26, which is formed with an annular seat 27 adapted to receive an annulus 28, said annulus being held by bolts 29. Suitable slotted washers or shims 30 of different thicknesses may be employed for adjusting the inner surface of a member 28 with respect to the similar surface of the associated disc member 17.

As seen in Figure 1, the wheel 13 preferably carries a tire 32 of friction material and which engages with the rings 28 carried by the discs 17.

Upon the lay shaft 12 there is mounted the two friction wheels 33—34, respectively, each of which is adapted to normally engage with the inner surface of the friction discs 17. The friction wheel 33 carries upon the forward side of its hub a friction ring member 35 which may be brought into operative relation with the rear face of the wheel 13. The friction wheel 34 is connected to the lay shaft 12 through an internal ring gear 36, a plurality of pinions and a gear 36′ carried by the hub of wheel 34. Also ball bearings are utilized as shown to minimize friction as much as possible. Upon the rear wall of the gear casing 10 there is rotatably supported a friction wheel 37 which likewise engages the ring 28 of each friction disc member 17.

Each friction disc is provided upon its inner face and centrally thereof with a recess or depression 38′ which is preferably of the shape shown.

A plurality of rods or shafts 38 are rotatably supported by the casing, said shafts having their ends journaled in the end walls of the casing. These shafts are preferably three in number, and each shaft has two screw thread portions 39 and 40, the screw portion 39 being of considerably less pitch than the screw portion 40. A spider 41 is movable upon the lay shaft 12, that is, splined upon the shaft the same as the friction wheel 33 and said spider having three arms 42, one for each of the rods 38 each arm terminating at its outer end in a collar 39′ having a screw-threaded opening in which the screw portion 39 of the associated rod 38 may operatively move, and thereby to move the friction wheel 33 in an obvious manner. A second spider 42′ is provided which is likewise splined upon the shaft 12 and which may be provided with three arms 43, one for each of the rods 38 and each arm carrying at its free end a collar or block 44 having a threaded opening therethrough adapted to operatively receive the screw portion 40 of associated rod 38. Each rod 38 has secured upon its forward end a sprocket wheel 46 and these sprocket wheels are operatively connected to each other by a sprocket chain 47. Also the sprocket chain 47 passes about a sprocket wheel 48 carried by the shaft 49, said shaft 49 being operatively connected through a pinion 50 and beveled gear 51 with a sleeve 52 positioned within the steering post 53. The sleeve 52 may be rotated by a handwheel 54.

At the bottom of the casing there is positioned a latch member generally indicated by the reference numeral 55, said latch member consisting of an elongated bar preferably of spring metal having the longitudinally extending slot 56′ which is offset, as at 57, and in which moves a pin 54′ carried by the associated collar 39′ of the spider 41. The latch member is pivotally supported at its one end, as at 58, and its other end is provided with an upstanding lug 56. Each rod or shaft 38 has positioned thereon a coiled spring 55′, said coil spring being interposed between the threaded portion 40 and one end wall of the casing 10.

In the use of the present device, assuming that the friction wheels 33 and 34 are located centrally upon the lay shaft 22 and the same would, therefore, be inoperative, that is, they would not operatively engage with the disc 17. If the engine of the motor vehicle was now started, the drive member 13 would rotate the disc 17 and at this time the operator might rotate the steering wheel 54 to move the friction wheel 34 rearwardly and upon the same engaging the disc 17 the vehicle would be started and the speed thereof would be gradually increased until the rearward movement of the friction wheel 34 was stopped. If, however, the driver wished to shift to high then he would continue the rearward movement of the friction wheel 34 until the same would eventually leave the disc 17 and cease to engage the same, and at this time the collar 44 associated with the latch member 45 would have reached a position rearward of the lugs 56. During this movement of the friction wheel 34 the friction wheel 33 has moved forwardly and now will engage with the disc 17 and thus continue the rotation of the shaft 12 at a slightly higher rate and with the continued rotating of the screw rods 38 the member 33 will move forwardly and increase the speed of the vehicle until eventually this member will reach the wheel 13 and frictionally engage the same whereby the shaft 12 is directly connected to the drive shaft 11. During this forward movement of the wheel 33, the collar 39′ upon the spider 41 has through its pin 54' shifted the latch element 55 so that its lug 56 is disposed in the path of the collar 44 and thereby locking the wheel 34 in its non-operative position. If the driver of the motor vehicle should contemplate a long run with this high speed of the motor vehicle, then he might operate the rod 25 whereby to move the disc members 17 so that they would be disengaged from the drive or friction wheel 13.

If the driver now should wish to return the member 33 to its neutral position he should bring the discs 17 into proper position and rotate the wheel 54 for moving the member 33 rearwardly. The member upon moving rearwardly will engage the disc 17 and gradually reduce the speed of the motor vehicle and at a moment previous to the wheel 33 entering the recesses 38', the pin 54' will move the latch element 55 so that the lug 56 does not obstruct the path of the associated collar 44, and whereupon the springs 55' will urge the spider 42' to move forwardly. At substantially the moment when the friction wheel 33 moves into the recesses 38', the member 34 will engage with the discs 17 and thus complete the gradual reduction of the speed of the motor vehicle until the same is brought to a stop.

In case an emergency stop was necessary during high speed of the motor vehicle, then the friction wheel 33 should be moved out of engagement with the drive wheel 13 and also the discs 17 moved out of engagement with the friction wheel 33. It will be noted that the wheel 37 serves to limit the inner movement of the discs 17. It also should be here stated that the present transmission is particularly adapted for use on motor vehicles employed for heavy hauling.

While I have shown and described the preferred form of my invention, I wish it to be understood, that I am aware of the fact that the construction, combination and arrangement of parts may be changed by those skilled in the art without departing from the spirit of the invention as indicated by the appended claims.

I claim:

1. In a transmission apparatus, a driven shaft, friction disks arranged about the driven shaft, means whereby said friction disks may be driven, a plurality of friction wheels separably movable longitudinally of the driven shaft, and means whereby said friction disks in conjunction with the friction wheels may be utilized for imparting different ratios of rotative movement to said driven shaft with individual movement thereon.

2. A transmission unit comprising in combination, a power shaft, a driven shaft, a plurality of friction discs arranged about said driven shaft, a friction wheel carried by the power shaft adapted to normally and operatively engage said friction disc, a pair of friction wheels splined upon said driven shaft, said friction wheels when disposed centrally of the friction disc being rendered inoperative, means whereby one of said friction wheels may be moved or shifted to gradually bring the driven shaft to a predetermined speed, and means whereby upon the completion of the movement of the last-named friction wheel the second friction wheel will be moved and thereby to gradually increase the speed of the driven shaft to its highest degree.

3. A transmission unit comprising in combination, a power shaft, a driven shaft, a plurality of friction discs arranged about said driven shaft, a friction wheel carried by the power shaft adapted to normally and operatively engage said friction discs, a pair of friction wheels splined upon said driven shaft, said friction wheels when being disposed centrally of the friction disc being rendered inoperative, means whereby one of said friction wheels may be moved or shifted to gradually bring the driven shaft to a predetermined speed, means whereby upon the completion of the movement of the last-named friction wheel the second friction wheel will be moved and thereby to gradually increase the speed of the driven shaft to its highest degree, and means whereupon completion of the shifting movement of the last-named friction wheel, the driven shaft will be automatically and directly connected to said power shaft.

4. A transmission unit comprising in combination, a power shaft, a driven shaft, a plurality of friction discs arranged about said driven shaft, a friction wheel carried by the power shaft adapted to normally and operatively engage said friction discs, a pair of friction wheels splined upon said driven shaft, said friction wheels when disposed centrally of the friction disc being rendered inoperative, means whereby one of said friction wheels may be moved or shifted to gradually bring the driven shaft to a predetermined speed, means whereby upon the completion of the movement of the last-named friction wheel the second friction wheel will be moved and thereby to gradually increase the speed of the driven shaft to its highest degree, means whereupon completion of the shifting movement of the last-named friction wheel, the driven shaft will be automatically and directly connected to said power shaft, and means whereby the friction wheel last shifted may be returned to its original position and during this interval the friction wheel first shifted will be maintained in a non-operative position.

5. A transmission unit comprising in combination, a power shaft, a driven shaft, a plurality of friction discs arranged about said driven shaft, a friction wheel carried by the power shaft adapted to normally and operatively engage said friction discs, a pair of friction wheels splined upon said driven shaft, said friction wheels when disposed centrally of the friction disc being rendered inoperative, means whereby one of said friction wheels may be moved or shifted to gradually bring the driven shaft to a predetermined speed, means whereby upon the completion of the movement of the last-named friction wheel the second friction wheel will be moved and thereby to gradually increase the speed of the driven shaft to its highest degree, means whereupon completion of the shifting movement of the last-named friction wheel, the driven shaft will be automatically and directly connected to said power shaft, means whereby the friction wheel last shifted may be returned to its original position and during this interval the friction wheel first shifted will be maintained in a non-operative position, and means whereupon the completion of the last named movement of the friction wheel secondly shifted, the friction wheel first shifted may be returned to its original position and thus to gradually reduce the speed of the driven shaft until brought to rest.

6. In a transmission apparatus of the character described, a driven shaft, a plurality of friction disks arranged about the driven shaft, a plurality of friction disks arranged about the driven shaft, means whereby said friction disks may be driven, a pair of friction wheels splined upon the driven shaft, said wheels having no engagement with the friction disks when arranged centrally thereof and when moved toward the outer peripheries of said disks adapted to be engaged by the disks and impart different ratios of rotative movement to said driven shaft.

7. In a transmission apparatus of the character described, a driven shaft, a plurality of friction disks arranged about the driven shaft, means whereby said friction disks may be driven, a pair of friction wheels splined upon the driven shaft, said wheels having no engagement with the friction disks when arranged centrally thereof and when moved toward the outer peripheries of said disks adapted to be engaged by the disks and impart different ratios of rotative movement to said driven shaft, and means whereby said friction wheels may be moved individually and in opposite directions upon said driven shaft.

8. In a transmission apparatus of the character described, a driven shaft, a plurality of friction disks arranged about the driven shaft, means whereby said friction disks may be driven, a pair of friction wheels splined upon the driven shaft, said wheels having no engagement with the friction disks when arranged centrally thereof and when moved toward the outer peripheries of said disks adapted to be engaged by the disks and impart different ratios of rotative movement to said driven shaft, means whereby said friction wheels may be moved individually and in opposite directions upon said driven shaft, and means whereby with one friction wheel completing its outward movement, the remaining friction wheel will automatically begin a similar movement upon said driven shaft.

FREDERICK HUSSEY TANNER.